US010368180B2

(12) United States Patent
Armstrong et al.

(10) Patent No.: US 10,368,180 B2
(45) **Date of Patent: *Jul. 30, 2019**

(54) TRANSLATING USER INTERFACE SOUNDS INTO 3D AUDIO SPACE

(75) Inventors: Andrew A. Armstrong, Chandlers Ford (GB); Jonathan C. Mace, Providence, RI (US); Matthew D. Whitbourne, Horndean (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1209 days.

This patent is subject to a terminal disclaimer.

(21) Appl. No.: 13/462,740

(22) Filed: May 2, 2012

(65) Prior Publication Data

US 2012/0266067 A1 Oct. 18, 2012

Related U.S. Application Data

(63) Continuation of application No. 13/424,246, filed on Mar. 19, 2012.

(30) Foreign Application Priority Data

Apr. 12, 2011 (EP) .................................... 11162027

(51) Int. Cl.
*G06T 15/00* (2011.01)
*H04S 5/00* (2006.01)

(52) U.S. Cl.
CPC ........... *H04S 5/005* (2013.01); *H04S 2400/11* (2013.01)

(58) Field of Classification Search
CPC ......... G06F 17/30017; G06F 17/30026; G06F 17/30061; G06F 17/30058; G06F 17/30064; H04S 5/005; H04S 2400/11
USPC ................ 715/716, 757, 782, 836, 848, 850
See application file for complete search history.

(56) References Cited

U.S. PATENT DOCUMENTS

| | | | | |
|---|---|---|---|---|
| 5,533,182 | A | 7/1996 | Bates et al. | |
| 5,617,526 | A | 4/1997 | Oran et al. | |
| 5,644,334 | A | 7/1997 | Jones et al. | |
| 6,297,818 | B1 | 10/2001 | Ulrich et al. | |
| 6,404,442 | B1 * | 6/2002 | Hilpert et al. | 715/727 |

(Continued)

FOREIGN PATENT DOCUMENTS

CN 101171882 A 4/2008

OTHER PUBLICATIONS

Mynatt, Elizabeth D., et al., "Audio Guis: Interacting with Graphical Applications in an Auditory World", CHI '95 Conference Proceedings, New York, NY, 1995. 3 pages.

(Continued)

*Primary Examiner* — Scott T Baderman
*Assistant Examiner* — Hassan Mrabi
(74) *Attorney, Agent, or Firm* — Marcia L. Doubet

(57) ABSTRACT

Translating user interface sounds into 3D audio comprises: receiving an audio request call from a process relating to a user interface event; converting the audio request call into a position in 3D audio space representative of the process from which the call has been received; and playing a corresponding sound in a surround sound system in the position in 3D audio space. Each open application in a graphical user interface may be provided with a sound space, in the 3D audio space, from which any event sounds are played.

9 Claims, 5 Drawing Sheets

(56) References Cited

U.S. PATENT DOCUMENTS

| | | | | |
|---|---|---|---|---|
| 6,414,677 | B1 * | 7/2002 | Robertson | G06F 3/04815 345/419 |
| 6,469,712 | B1 | 10/2002 | Hilpert, Jr. et al. | |
| 6,532,005 | B1 | 3/2003 | Campbell | |
| 7,398,475 | B2 | 7/2008 | Vronay et al. | |
| 7,626,569 | B2 * | 12/2009 | Lanier | 345/156 |
| 8,768,494 | B1 * | 7/2014 | Stroud et al. | 700/94 |
| 2005/0222844 | A1 | 10/2005 | Kawahara et al. | |
| 2006/0236255 | A1 | 10/2006 | Lindsay et al. | |
| 2008/0253592 | A1 | 10/2008 | Sanders et al. | |
| 2009/0259942 | A1 | 10/2009 | Bitonti et al. | |
| 2010/0142724 | A1 | 6/2010 | McManus et al. | |
| 2012/0105603 | A1 * | 5/2012 | Liu et al. | 348/51 |
| 2012/0129543 | A1 | 5/2012 | Patel et al. | |

OTHER PUBLICATIONS

Parente, Peter, "Clique: A conversant, task-based audio display for GUI applications", SIGAccess Newsletter, Jan. 2006 (Issue 84), pp. 34-37.
Boardman, David B., et al., "Listen: A Tool to Investigate the Use of Sound for the Analysis of Program Behavior", in Proceedings of the 19th Annual International Computer Software and Applications Conference (COMPSAC '95), pp. 184-193, Dallas, TX, Aug. 1995. IEEE Press. (Abstract only).
Boardman, David B., et al., "Listen: A Tool to Investigate the Use of Sound for the Analysis of Program Behavior", in Proceedings of the 19th Annual International Computer Software and Applications Conference (COMPSAC '95), pp. 184-193, Dallas, TX, Aug. 1995. IEEE Press.
Boardman, David B., et al., "Listen: A Tool to Investigate the Use of Sound for the Analysis of Program Behavior", Feb. 26, 2001. 15 pages.
PCT Application PCT/IB2012/050659, Notification of Transmittal of the International Search Report and the Written Opinion, and International Search Report dated Jun. 28, 2012 (7 pages).
PCT Application PCT/IB2012/050659, Written Opinion dated Jun. 28, 2012 (7 pages).
Andrew A. Armstrong, et al., U.S. Appl. No. 13/424,246, filed: Mar. 19, 2012, Office Action, dated Jul. 16, 2014, 11 pages.
Andrew A. Armstrong, et al., U.S. Appl. No. 13/424,246, filed: Mar. 19, 2012, Office Action, dated Jan. 15, 2015, 10 pages.
Andrew A. Armstrong, et al., U.S. Appl. No. 13/424,246, filed: Mar. 19, 2012, Office Action, dated Jun. 18, 2015, 13 pages.
Andrew A. Armstrong, et al., U.S. Appl. No. 13/424,246, filed: Mar. 19, 2012, Office Action, dated Nov. 25, 2015, 27 pages.

* cited by examiner

TRANSLATING USER INTERFACE SOUNDS INTO 3D AUDIO SPACE

BACKGROUND

This invention relates to the field of user interfaces. In particular, the invention relates to translating user interface sounds into a three-dimensional (3D) audio space.

Computer users may be overwhelmed by large amounts of graphical information displayed on a screen simultaneously. People often perform multiple tasks when using a computer, and as the number of tasks increases, so does the amount of time that the user has to spend switching between and organising the tasks and programs in order to gauge what is going on.

Many programs use common sounds to accompany status and information messages, for example, the Windows® "exclamation" sound. (Windows is a registered trade mark of Microsoft Corporation in the United States, other countries, or both.) If a person is using multiple programs, and a sound comes from a program in the background, the user will have to tab through all their programs to figure out which program made the sound. Also, if more than one program makes the same alert sound, it is not possible to distinguish between the applications to determine the origin of the alert.

Additionally, users with accessibility options turned on may use screen readers and other such solutions to identify and interpret what is being displayed on a screen and to present the information with sound. Such screen readers may be ineffective at providing the detail and clarity needed to build a good understanding of what is happening on screen as a whole.

BRIEF SUMMARY

Embodiments of the present invention are directed to translating user interface sounds into 3D audio space, comprising: receiving an audio request call from a process relating to a user interface event; converting the audio request call into a position in 3D audio space wherein the position is representative of the process from which the call has been received; and playing a corresponding sound in a surround sound system in the position in the 3D audio space.

Embodiments of the present invention may be provided as methods, systems, and/or computer program products.

BRIEF DESCRIPTION OF THE SEVERAL VIEWS OF THE DRAWINGS

The present invention will now be described, by way of example only, with reference to preferred embodiments, as illustrated in the following figures.

Figure 1:
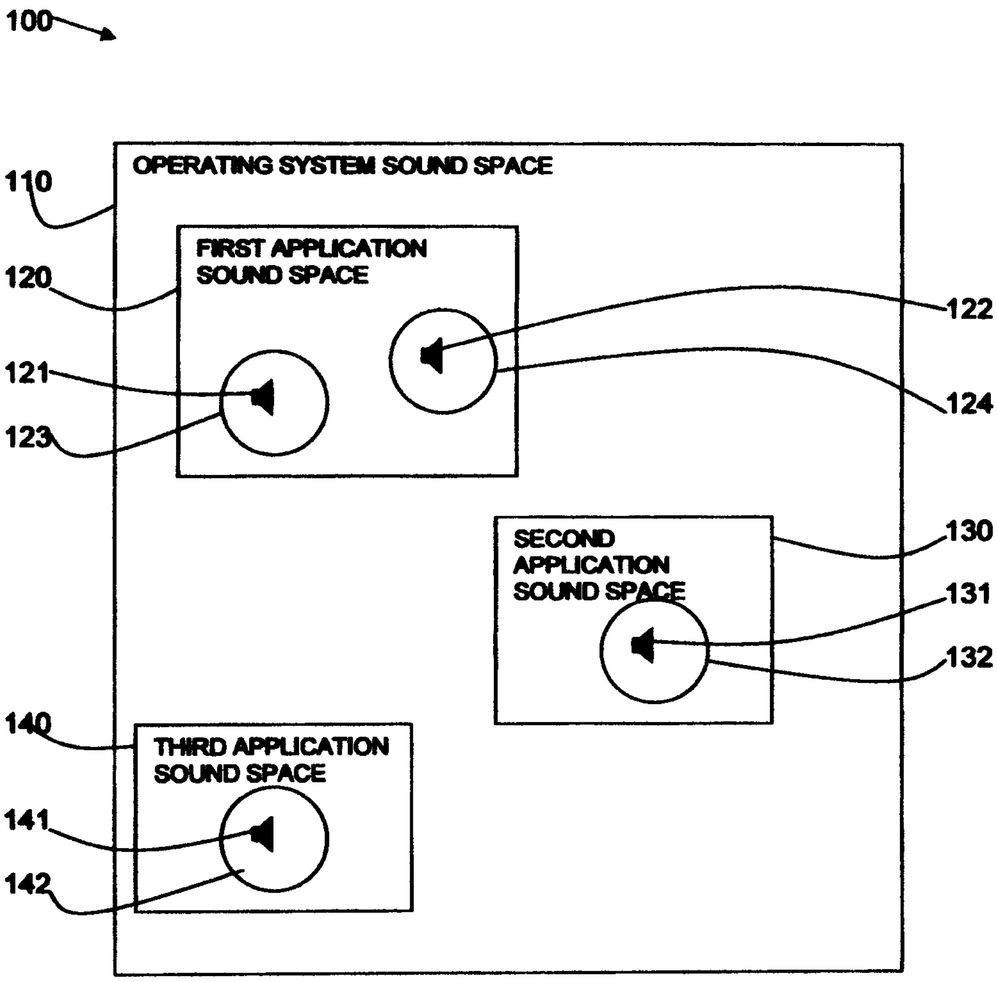
FIG. 1 is a schematic diagram of an operating system sound space in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Embodiments are described for notification of user interface event sounds by translating the sounds into 3D audio space. The user interface event sounds may include sounds relating to graphical user interface (GUI) events, application window events, application activity, screen reader output, operating system events, window manager events, or any other form of event for which a sound may be generated relating to the activity of the computer. The user interface space is enhanced to provide richer feedback through audio for the user using a surround sound system, such as 5.1 surround sounds or 7.1 surround sound.

This solution makes use of surround sound systems so that sounds can have position associated with them. By using surround sound, the user can receive extra, useful information about the GUI and applications they are using, from a source which would otherwise not convey any information.

Extra information may be provided about the GUI such as the status of running applications. Each application open in a GUI may have a sound space associated with it. Different event or status sounds may have positions within the application's sound space.

In one embodiment, sounds such as notifications and alerts or voice from the screen reader may be based on the position of the application window in the GUI. In some cases, the position may be exaggerated in the 3D audio space to provide greater distinction between application positions. If multiple monitors are being used, then sounds from windows on one screen can be played as though they were coming from the direction of that screen.

In another embodiment, applications may be grouped by application types and sounds from a given application type may come from a similar position in the 3D audio space.

In a further embodiment, events which generate sounds may be prioritized, with high priority event sounds coming from a given position (such as from the front) and low priority event sounds coming from a different position (such as from behind the user).

In another embodiment, audio played while moving an application window or icon from one position to another position may be moved through the 3D audio space in order to notify the move event to the user. The position can be determined by exaggerating the current application window or icon position.

Directional variance may also be used as an application event indicator. For example, an application sound may move from a first position to a second position to indicate a change in status, such as start-up, shutdown, or moving to a background task.

The positional sound may be controlled by the operating system. Each application is given a subset of the sound space as its own. Applications may also request a particular position to play sound from. Then within that application's space, sounds may be played at various positions. Positions of sounds can be simply represented as (x,y,z) co-ordinates, or through more advanced techniques.

Referring to FIG. 1, a schematic diagram 100 shows a simple embodiment of the described system. The schematic diagram 100 shows an operating system sound space 110. Multiple applications running on the operating system may be allocated or request positions in the operating system sound space 110.

A first application sound space 120 may be designated for a first application. Within the first application sound space 120, different sounds, such as sound_1 121 and sound_2 122, may have different locations 123, 124.

A second application sound space 130 may be designated for a second application. A sound 131 may have a designated location 132 within the second application's sound space 130. Similarly, a third application sound space 140 may be designated for a third application. A sound 141 may have a designated location 142 within the third application's sound space 140.

The operating system sound space 110 is a 3D audio space relayed in a surround sound system.

Surround sound encompasses a range of techniques for enriching the sound reproduction quality of an audio source with audio channels reproduced via additional, discrete speakers. Surround sound is characterized by a listener location or sweet spot where the audio effects work best, and presents a fixed or forward perspective of the sound field to the listener at this location.

The three-dimensional (3D) sphere of human hearing can be virtually achieved with audio channels that surround the listener. To that end, the multi-channel surround sound application encircles the listener with surround channels (left-surround, right-surround, back-surround).

Figure 2:
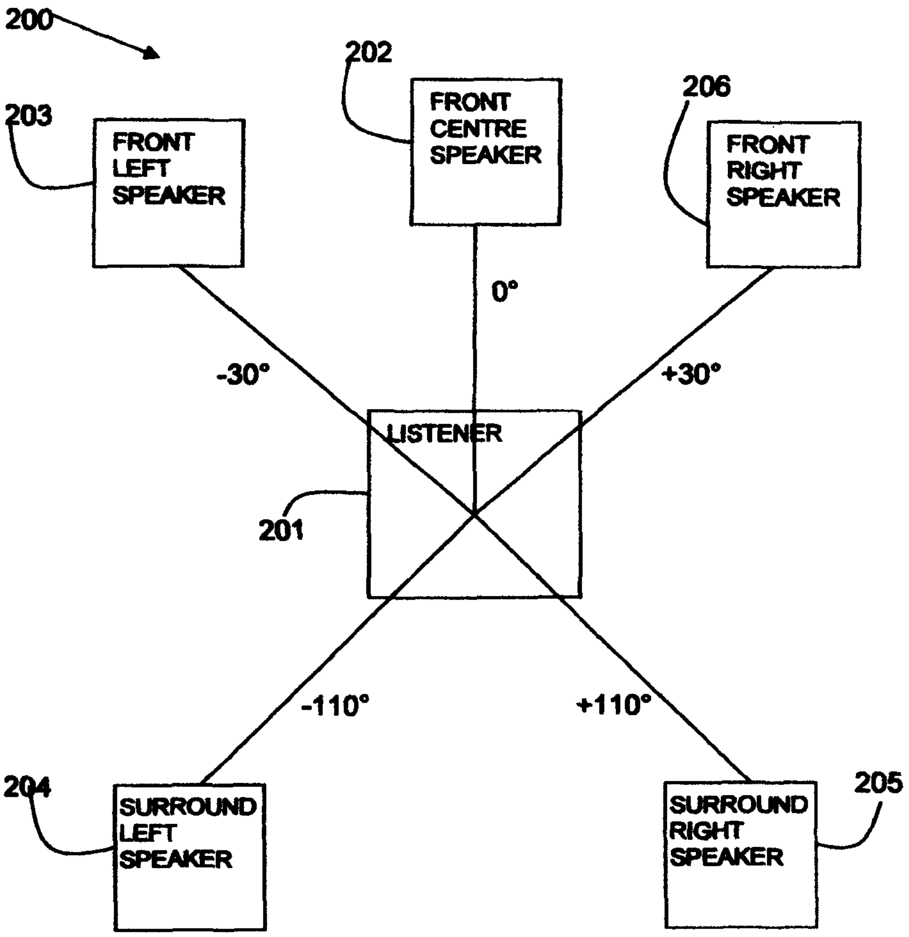
FIG. 2 is a schematic diagram of a surround sound system as used in the present invention.

Referring to FIG. 2, a schematic diagram 200 shows an example surround sound system based on the 5.1 surround sound system. The 5.1 surround sound system uses five full bandwidth channels and one low frequency channel. There are five speakers 202-206, one for each of the full bandwidth channels configured around a listener 201. The speakers 202-206 are positioned at the front-centre 202 (at 0 degrees in a circle around the listener 201), at front-left 203 (−30 degrees), at surround-left 204 (−110 degrees), at surround-right 205 (at +110 degrees), and at front-right 206 (+30 degrees).

A 7.1 surround sound system uses seven full bandwidth channels and one low frequency channel and is similar to the 5.1 surround sound with extra channel speakers provided as rear speakers at +/−150 degrees.

In most cases, surround sound systems rely on the mapping of each source channel to its own loudspeaker. Matrix systems recover the number and content of the source channels and apply them to their respective loudspeakers. With discrete surround sound, the transmission medium allows for (at least) the same number of channels of source and destination; however, one-to-one, channel-to-speaker, mapping is not the only way of transmitting surround sound signals.

The transmitted signal may encode the information (defining the original sound field) to a greater or lesser extent; the surround sound information is rendered for replay by a decoder generating the number and configuration of loudspeaker feeds for the number of speakers available for replay—one renders a sound field as produced by a set of speakers, analogously to rendering in computer graphics.

Figure 3:
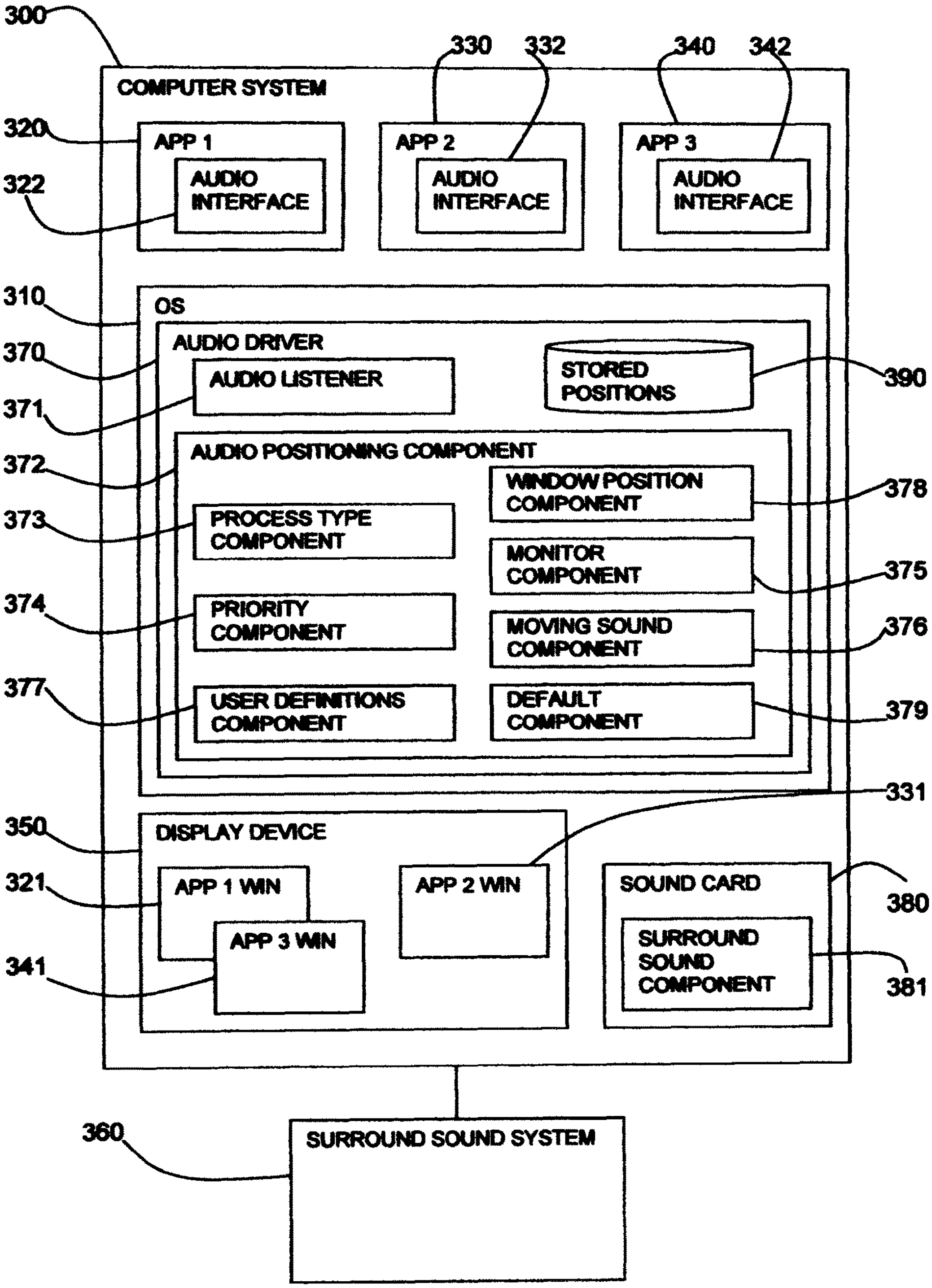
FIG. 3 is a block diagram of a system in accordance with the present invention.

Referring to FIG. 3, a block diagram shows a computer system 300 embodying the described system.

A general computer system 300 includes operating system software 310 and multiple applications 320, 330, 340. A display device provides a GUI 350 for the operating system and displays application windows 321, 331, 341 for running applications 320, 330, 340 on the display device.

In the described system 300, a surround sound system 360 is provided positioned around the system user position to provide 3D audio for the user.

The operating system 310 may include an audio driver 370 which handles data connections between the physical hardware of the system 300, such as a sound card 380 which has a surround sound component 381.

The audio driver 370 may include an audio listener 371 for listening for process request calls from audio interfaces 322, 332, 342. The process request calls may come from applications, the operating system, a window manager, a screen reader, etc. The audio driver 370 may include an audio positioning component 372 for converting process request calls to positions in the 3D audio space.

The positioning component 372 may include additional components for determining the positions according to the process making the requests, or the form of the requests. The process request call may specify the position in the audio space in which case the positioning component 372 allocates that position.

In other embodiments, the position may be determined by the positioning component 372. A window position component 378 may determine the position of a process window in the GUI and allocate a position in 3D audio space corresponding to or exaggerating the position in the GUI.

A process type component 373 may determine a process type and allocate a position according to a stored set of positions 390. A priority component 374 may determine a priority of an event generating a sound and may allocate a position according to stored set of positions 390.

A monitor component 375 may determine if multiple monitors or extended desktops are being used and allocate a position according to a monitor or extended desktop position.

A moving sound component 376 may be provided to provide a moving sound from a first position to a second position, or between multiple positions (for example, travelling around the user position). The moving sound component 376 may convert moving coordinates of a window in the GUI to moving coordinates in the audio space. Alternatively, the moving sound component 376 may be applied to specific events.

The positioning component 372 may include a user definitions component 377 for enabling a user to define positions for applications, types of applications, monitors, priority processes, etc.

A default component 379 may be provided for assigning a default position in an unused part of the overall sound space.

Stored positions 390 may be provided of absolute positions as well as logical mappings of positions. For example, logical mappings of positions may be used where multiple desktops play from different audio planes.

Figure 4:
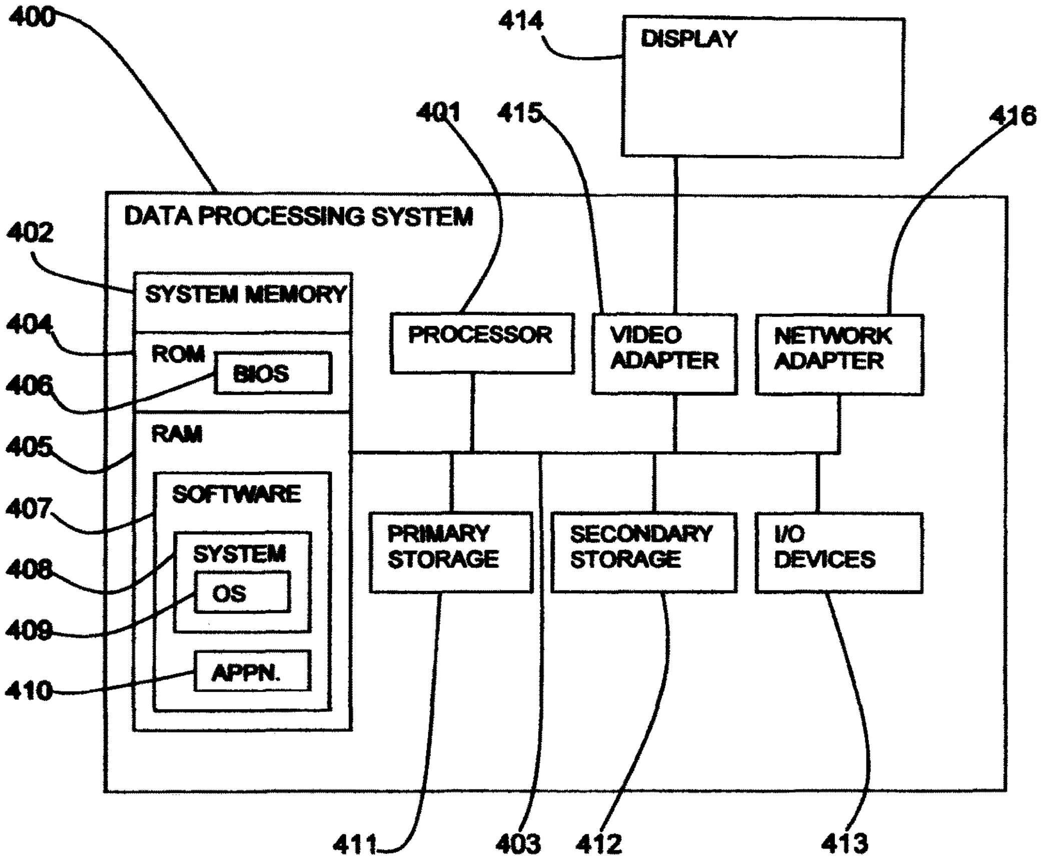
FIG. 4 is a block diagram of a computer system in which the present invention may be implemented.

Referring to FIG. 4, an exemplary system for implementing aspects of the invention includes a data processing system 400 suitable for storing and/or executing program code including at least one processor 401 coupled directly or indirectly to memory elements through a bus system 403. The memory elements can include local memory employed during actual execution of the program code, bulk storage, and cache memories which provide temporary storage of at least some program code in order to reduce the number of times code must be retrieved from bulk storage during execution.

The memory elements may include system memory 402 in the form of read only memory (ROM) 404 and random access memory (RAM) 405. A basic input/output system (BIOS) 406 may be stored in ROM 404. Software 407, including system software 408, may be stored in RAM 405, including operating system software 409. Software applications 410 may also be stored in RAM 405.

The system 400 may also include a primary storage means 411, such as a magnetic hard disk drive, and secondary storage means 412, such as a magnetic disc drive and an optical disc drive. The drives and their associated computer-readable media provide non-volatile storage of computer-executable instructions, data structures, program modules, and other data for the system 400. Software applications may be stored on the primary and secondary storage means 411, 412 as well as in the system memory 402.

The computing system 400 may operate in a networked environment using logical connections to one or more remote computers via a network adapter 416.

Input/output devices 413 can be coupled to the system either directly or through intervening I/O controllers. A user may enter commands and information into the system 400 through input devices such as a keyboard, pointing device, or other input devices (for example, microphone, joy stick, game pad, satellite dish, scanner, or the like). Output devices may include speakers, printers, etc. A display device 414 is also connected to system bus 403 via an interface, such as video adapter 415.

Embodiments of the present invention may use OpenAL (Open Audio Library) as an audio API for the applications for efficient rendering of multi-channel three-dimensional positional audio. The general functionality of OpenAL is encoded in source objects, audio buffers, and a single listener. A source object contains a pointer to a buffer; the velocity, position, and direction of the sound; and the intensity of the sound. The listener object contains the velocity, position, and direction of the listener, and the general gain applied to all sound.

The nature of the subsets of sound space for applications are user-specific with some sensible defaults for newly-installed implementations. The user may define where specific types of applications should play their alerts.

For instance, categorization could be based upon specific applications:

Application 1 Playback from the right side;

Application 2 Playback from behind;

Application 3 Playback from behind (where application 3 is of a same type as application 2).

In another example, the position may be based upon the priority of the process of application:

High priority processes within the system—Playback from the front side;

Low priority processes within the system—Playback from behind.

The application may request a sound position using standard calls to audio drivers, for example, using OpenAL audio API. Thus if an application makes a request to play a piece of audio, it would be caught by an appropriate audio listener at the audio driver level, and based on the subset lookup, "Playback from the right side" would direct the audio driver to play the sound from the right.

In addition to an application requesting an audio sound position, the operating system or window manager may also provide a sound position. For example, in a scenario where two versions of an application are running with the user interface for each displayed on different extended desktops, the input for sound may come from the operating system or the window manager instead of the application itself. This may or may not override any application-specific settings depending on user choice, or may be done in combination.

In the case of screen readers, they are effectively an application; however, where they are reading from (the parent application) will determine the audio position.

A position in the audio space may be based on (x,y,z) coordinates. Alternatively, positions may be based on general areas such as right, left, behind, front, or indeed front left, rear right, etc. These possibilities are limited only by the audio driver for the surround sound system.

Figure 5:
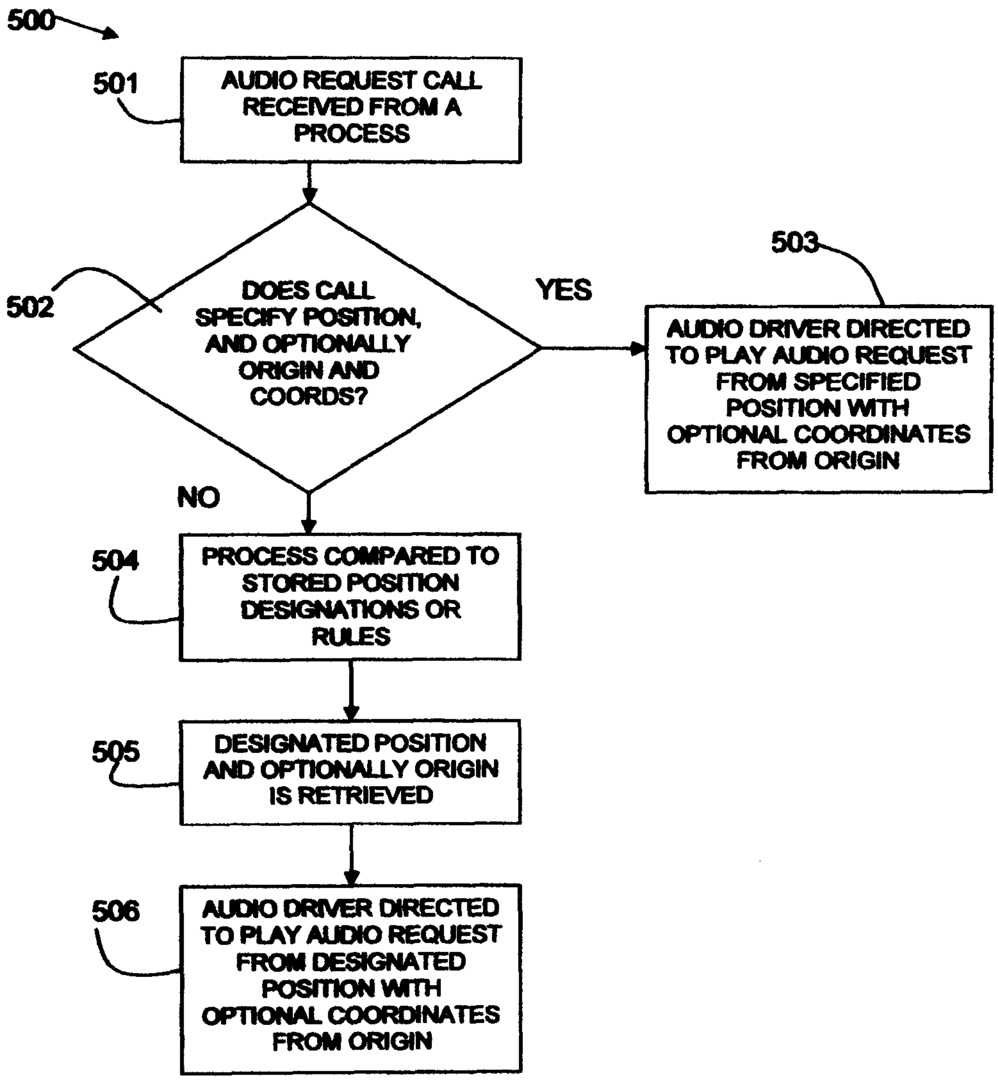
FIG. 5 is a flow diagram of a method in accordance with the present invention.

Referring to FIG. 5, a flow diagram 500 shows an embodiment of the described method. An audio request call is received 501 from a process, which may be from an application, an operating system, or a window manager.

It is determined 502 if the call specifies an audio space or position and, optionally, coordinates from an origin within the audio space. For example, in the case of an application, a sound position may be specified within the application's audio space as (x,y,z) offsets from an origin within the audio space. No offsets included would count as an offset of (0,0,0).

If the audio space and origin are specified, the audio driver is directed 503 to play the audio request from the specified position by adding the offsets to the origin position to determine the precise position of the sound within the application's audio space.

If no audio space or position is specified, the process making the request call is compared 504 to a stored position designation. This step may check for a stored audio space or position for a process matching the process making the request 501, or may apply rules in order to calculate an audio space or position. For example, if the application is of a type 1, the position may be designated as "behind", or if the application process requires a password to be entered, this may be considered to be high priority and a designated position may be "front centre". If the process does not match stored processes or rules, a default position may be provided, for example, in an unused part of the overall sound space.

A designated audio space or position is retrieved 505 as well as any origin position in an audio space. The audio driver is directed 506 to play the audio request from the designated position. If offsets are provided in the process request 501, they are added to the origin position to determine the precise position of the sound within the audio space.

In the case of a moving sound in which the audio reflects the movement of the object or illustrates an event by a moving sound, two or more positions are specified or designated and the audio is played moving from between the positions.

In an example scenario, instant messaging notification "beeps" may come from behind a user, all text editor notifications may come from the left of the user, and all Internet browser notifications may come from the right. If there are multiple windows displayed, then notification sounds from the background windows may come from further away.

If a user is using multiple monitors, then sounds from windows on one screen can be played as though they were coming from that direction. For example, if there is a monitor on the user's left, on which he is installing a program, the sounds can come from that direction. If a screen reader is reading a window in a particular position, then the sound can come from that direction.

Additionally, if a window is moved from one location on a screen to another, an audible pairing with this move event could be added to inform the user with audio feedback such as the sound moving position in the audio space.

An advantage of the described invention is that the user is given more information on the status of their applications using a sensory input which is rarely attached to the GUI space. It allows a user to make his or her work more efficient and respond to specific events quicker as they are received.

A system for translating user interface sounds into 3D audio space may be provided as a service to a customer over a network.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain or store the program for use by or in connection with the instruction execution system, apparatus, or device.

The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read only memory (ROM), a rigid magnetic disk, and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A method for translating event sounds into 3-dimensional (3D) audio space, comprising:
intercepting, by a listener process, an audio request call received from a process, wherein:
the audio request call relates to a process having an open window on a graphical user interface ("GUI") of a 2-dimensional (2D) GUI device and specifies at least two positions, within a 3D audio space; and
the audio request call requests to play a sound corresponding to a change in current status of the process; and
playing the corresponding sound in a surround sound system as moving through the 3D audio space between each of the at least two positions to thereby notify a user of the 2D GUI device of the change in current status of the process.

2. The method as claimed in claim 1, wherein the process is an application and further comprising:
defining, for each application having an open window on the 2D GUI device, a separate application-specific portion of the 3D audio space; and
converting each of the specified at least two positions to corresponding positions within the application-specific portion of the 3D audio space defined for the application, such that the played sounds plays within the application-specific portion of the 3D audio space defined for the application.

3. The method as claimed in claim 2, wherein the defining further comprises:
determining a position where the window of the application is open on the 2D GUI device; and
defining a position of the application-specific portion of the 3D audio space defined for the application as corresponding to the position where the window of the application is open on the 2D GUI device.

4. The method as claimed in claim 1, wherein the change in the current status comprises a start-up of the process.

5. The method as claimed in claim 1, wherein the change in the current status comprises a shutdown of the process.

6. The method as claimed in claim 1, wherein the change in the current status comprises the process moving from a foreground to a background of the GUI.

7. A method for translating event sounds for a 2-dimensional (2D) graphical user interface into 3-dimensional (3D) audio space, comprising:
intercepting, by a listener process, an audio request call received from a process, wherein:
the audio request call relates to a process having an open window on a graphical user interface ("GUI") of a 2D GUI device and specifies a predefined process-specific subset of a 3D audio space and a 3D offset within the specified subset; and
the audio request call requests to play a sound corresponding to occurrence of an event of the process;
determining a predefined 3D origin point in the specified process-specific subset;
adding, to the determined predefined 3D origin point, the received 3D offset to thereby calculate a position within the specified process-specific subset; and
playing the corresponding sound in a surround sound system in the calculated position within the specified process-specific subset of the 3D audio space to thereby notify a user of the 2D GUI device of the occurrence of the event of the process.

8. The method as claimed in claim 7, wherein the predefined process-specific subset corresponds to a position where the window of the process is open on the 2D GUI device.

9. The method as claimed in claim 7, further comprising:
determining that the sound corresponding to the occurrence of the event is a moving sound; and
playing the moving sound as starting from the calculated position.

* * * * *